(12) United States Patent
Yoshimizu

(10) Patent No.: US 8,447,490 B2
(45) Date of Patent: May 21, 2013

(54) VEHICLE POWER TRANSMISSION APPARATUS

(75) Inventor: Kazutaka Yoshimizu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 172 days.

(21) Appl. No.: 13/162,654

(22) Filed: Jun. 17, 2011

(65) Prior Publication Data

US 2011/0313632 A1   Dec. 22, 2011

(30) Foreign Application Priority Data

Jun. 18, 2010   (JP) ................................. 2010-139290

(51) Int. Cl.
*B60T 7/12*   (2006.01)
(52) U.S. Cl.
USPC .................. 701/97; 701/51; 701/61; 701/67; 477/48; 477/62; 477/98; 477/143
(58) Field of Classification Search
USPC ................ 701/51, 61, 67, 97; 477/48, 62, 98, 477/143
See application file for complete search history.

(56) References Cited

U.S. PATENT DOCUMENTS

| | | | | |
|---|---|---|---|---|
| 5,188,007 A * | 2/1993 | Hattori et al. | .................... | 474/28 |
| 5,527,233 A * | 6/1996 | Tabata et al. | .................... | 477/62 |
| 6,125,316 A * | 9/2000 | Sasaki et al. | .................... | 701/62 |
| 7,356,399 B2 * | 4/2008 | Eguchi et al. | .................... | 701/61 |
| 7,575,111 B2 * | 8/2009 | Ogata et al. | .................... | 192/3.3 |
| 7,643,924 B2 * | 1/2010 | Kawamura et al. | ............. | 701/62 |
| 7,899,593 B2 * | 3/2011 | Mizobuchi et al. | ......... | 701/31.8 |
| 8,012,051 B2 * | 9/2011 | Soga | ............................... | 474/18 |
| 8,070,650 B2 * | 12/2011 | Ogata et al. | .................... | 477/48 |
| 8,275,510 B2 * | 9/2012 | Tanaka et al. | ................ | 701/31.4 |
| 2001/0036878 A1 * | 11/2001 | Itou et al. | ...................... | 475/116 |
| 2006/0149433 A1 * | 7/2006 | Otsubo et al. | ................... | 701/29 |
| 2007/0186632 A1 * | 8/2007 | Endo et al. | .................... | 73/118.1 |
| 2008/0183352 A1 * | 7/2008 | Mizobuchi et al. | ............ | 701/35 |
| 2009/0038387 A1 * | 2/2009 | Endo et al. | ................. | 73/118.01 |
| 2009/0280953 A1 * | 11/2009 | Nishimine et al. | .............. | 477/62 |
| 2009/0319144 A1 * | 12/2009 | Tanaka et al. | ................... | 701/61 |
| 2010/0191407 A1 * | 7/2010 | Tanaka et al. | ................... | 701/29 |
| 2011/0087397 A1 * | 4/2011 | Iraha et al. | ...................... | 701/29 |

FOREIGN PATENT DOCUMENTS

| | | |
|---|---|---|
| JP | 2001050382 A | 2/2001 |
| JP | 2004322740 A | 11/2004 |

(Continued)

OTHER PUBLICATIONS

Office action issued May 8, 2012 in Japanese Patent Application No. JP2010-139290 and partial English language translation thereof.

*Primary Examiner* — James P Trammell
*Assistant Examiner* — Truc M Do
(74) *Attorney, Agent, or Firm* — Gifford, Krass, Sprinkle, Anderson & Citkowski, P.C.

(57) ABSTRACT

A control unit (200) executes fail-safe control that forcibly releases a lockup clutch (15) by activating a fail-safe valve (112), abnormality diagnosis control that determines whether a solenoid valve (DSU) is suffering from a solenoid ON abnormality when the vehicle has started with the fail-safe control executed, and reproduction control that simulatively reproduces, when the vehicle has started without the fail-safe control executed, a condition coinciding with the condition for allowing execution of the abnormality diagnosis control.

7 Claims, 5 Drawing Sheets

FOREIGN PATENT DOCUMENTS

| JP | 2006300285 A | 11/2006 |
| JP | 2008051316 A | 3/2008 |
| JP | 2008185088 A | 8/2008 |
| JP | 2009180320 A | 8/2009 |

* cited by examiner

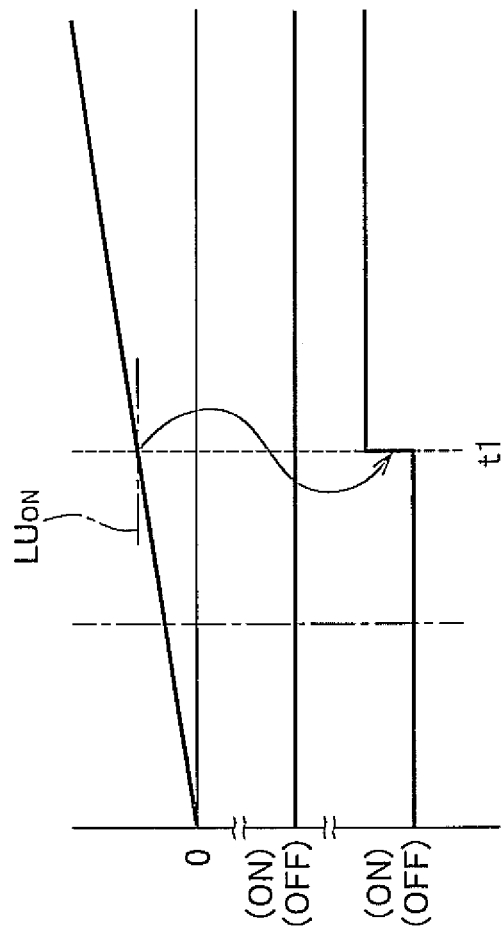

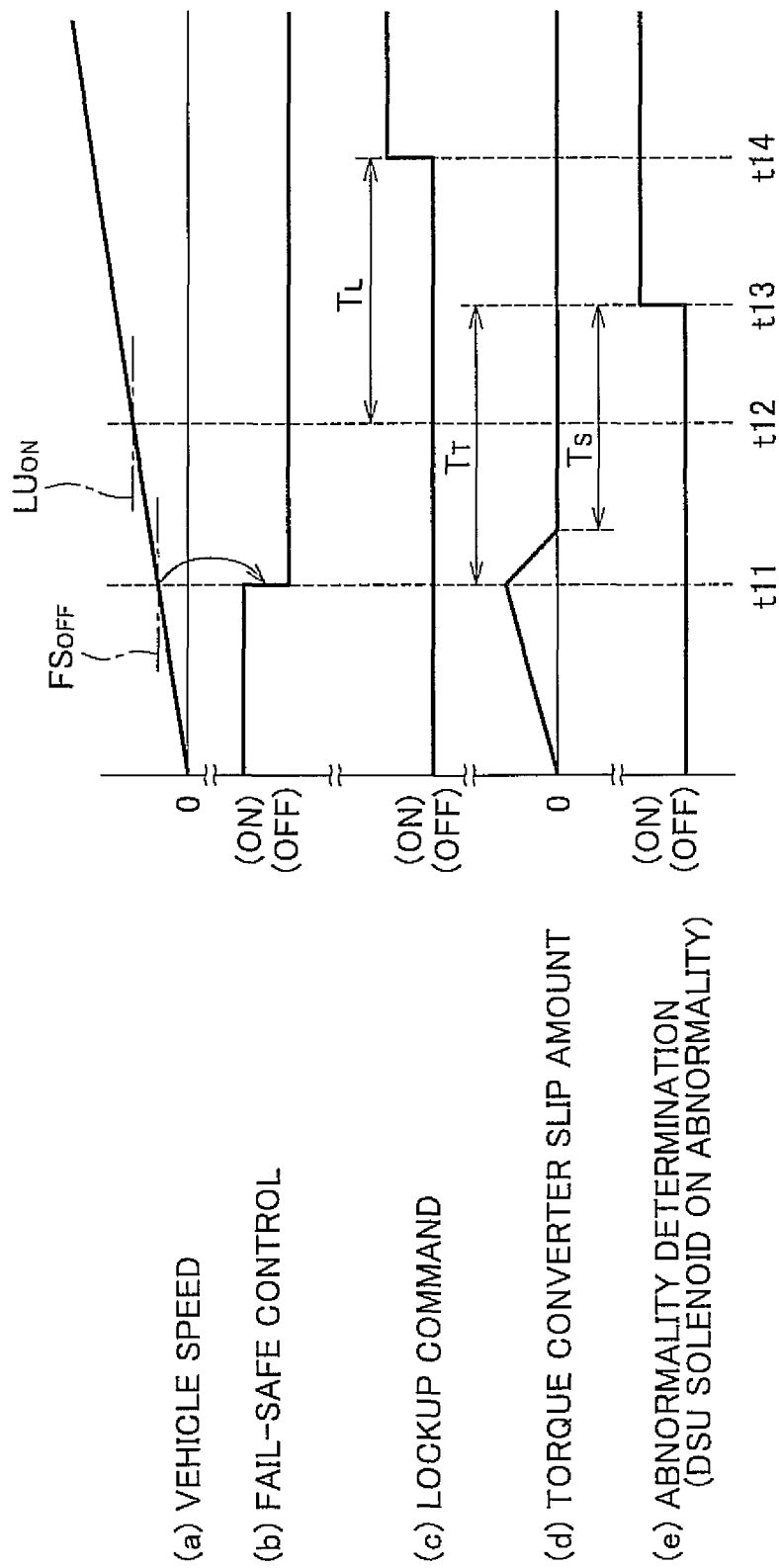

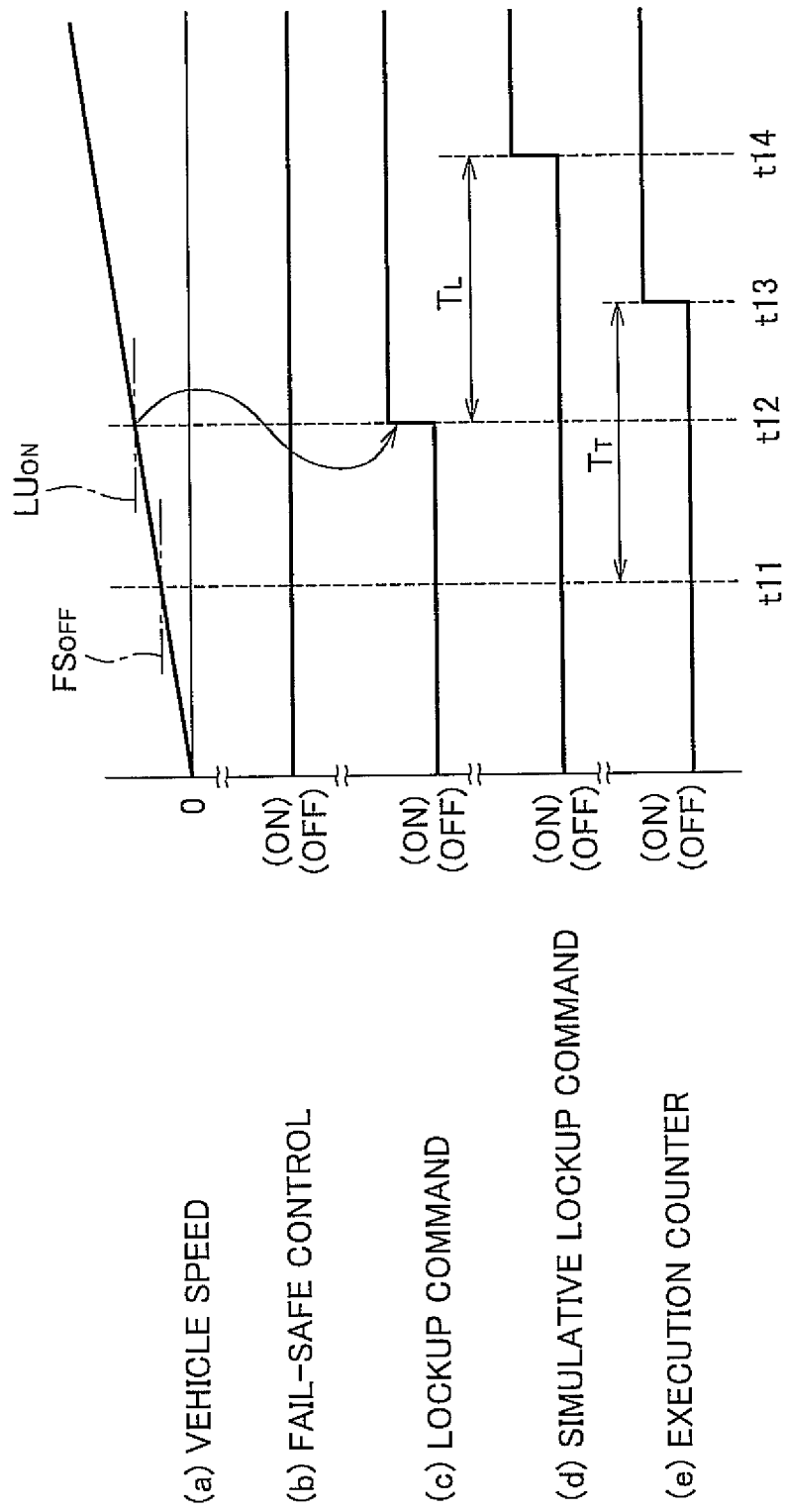

VEHICLE POWER TRANSMISSION APPARATUS

CROSS-REFERENCE TO RELATED APPLICATIONS

This application claims priority to Japanese Patent Application No. 2010-139290 filed on Jun. 18, 2010, which is incorporated herein by reference in its entirety including the specification, drawings and abstract.

BACKGROUND OF THE INVENTION

1. Field of the Invention

The invention relates to a vehicle power transmission apparatus provided with a torque converter having a lockup clutch.

2. Description of Related Art

In recent years, automatic transmission torque converters having a lockup clutch for directly connecting the input and output sides of the torque converter have been used.

For example, Japanese Patent Application Publication No. 2008-51316 (JP-A-2008-51316) (refer to paragraphs 0061 to 0067) describes a system that controls, using a hydraulic pressure control circuit, the differential pressure between the apply side hydraulic chamber and the release side hydraulic chamber of a torque converter (lockup differential pressure) to apply a lockup clutch (lockup ON) and release it (lockup OFF).

More specifically, the hydraulic pressure control circuit described above controls the operation hydraulic pressures input, respectively, to the apply side hydraulic chamber and release side hydraulic chamber of the torque converter by turning on and off a spool valve, called "lockup control valve", using a duty solenoid valve for lockup control (will be referred to as "lockup control duty solenoid valve"). Normally, the lockup clutch is applied (lockup ON) in response to the vehicle speed reaching a predetermined lockup ON determination value after the start of the vehicle.

If an abnormality causing the solenoid of the lockup control duty solenoid valve to remain in an on state (will hereinafter be referred to as "solenoid ON abnormality") occurs, the lockup control duty solenoid valve continues to output a control hydraulic pressure to the lockup control valve, resulting in the lockup clutch stuck in the applied state. If the vehicle is stopped while such an abnormality is occurring, the engine will stall when the vehicle starts the next time.

In order to avoid such an engine stall at the start of the vehicle, fail-safe control is executed which forces the lockup clutch to be placed in the released state for the period from the start of the vehicle to the vehicle speed reaching a predetermined speed.

In the fail-safe control, a control hydraulic pressure for releasing the lockup clutch (lockup OFF) is input to the lockup control valve from another spool valve that is called "clutch apply control valve" and provided in the hydraulic pressure control circuit, thus forcibly releasing the lockup clutch independently of whether or not the control hydraulic pressure for applying the lockup clutch (lockup ON) is being input to the lockup control valve from the lockup control duty solenoid valve.

An in-vehicle abnormality diagnosis system (OBD: Onboard Diagnosis System) incorporated in an automatic transmission control unit performs diagnosis on a number of diagnosis items. For example, it has been proposed to use such a diagnosis system to detect whether the lockup control duty solenoid valve is suffering from a solenoid ON abnormality and record the particulars of the detected abnormality in a memory.

To accomplish diagnosis on this diagnosis item, that is, diagnosis for a solenoid ON abnormality of the lockup control duty solenoid valve, the following diagnosis method is used. In a case where the vehicle has started with the fail-safe control executed, the fail-safe control is discontinued by a fail-safe control discontinuation command being output in response to the vehicle speed reaching a predetermined fail-safe OFF determination value, and then the amount of slip at the toque converter (will be referred to as "the slip amount of the torque converter") is examined.

After the fail-safe control has been thus discontinued, if the lockup control duty solenoid valve is functional, the lockup clutch remains in the released state (lockup OFF), and therefore the slip amount of the torque converter gradually increases from the discontinuation of the fail-safe control, and if the lockup control duty solenoid valve is suffering from a solenoid ON abnormality, on the other hand, the lockup clutch is applied (lockup ON) and therefore the slip amount of the torque converter decreases and then becomes zero.

As such, it is possible to determine that the lockup control duty solenoid valve is suffering from a solenoid ON abnormality when it is detected that the slip amount of the torque converter has become zero. However, in order to examine whether such a phenomenon is a temporary phenomenon, preferably, it is determined whether the slip amount of the torque converter has continuously been zero for a predetermined period of time. This determination process is necessary to improve the abnormality diagnosis accuracy.

In consideration of the nature, purpose, and the like, of the abnormality diagnosis that examines the slip amount of the torque converter in a situation as described above, the fail-safe OFF determination value needs to be set to a value smaller than the lockup ON determination value (i.e., a value corresponding to a lower vehicle speed). The smaller the difference between the fail-safe OFF determination value and the lockup ON determination value, the more likely the time allowed for executing processes for improving the abnormality diagnosis accuracy, that is, the duration of the abnormality diagnosis is to be insufficient. In view of this, the applicant has conceived of, as an option for securing sufficient time for the abnormality diagnosis, outputting a lockup ON command (i.e., a command for applying the lockup clutch) a predetermined time after the vehicle speed reaches the lockup ON determination value, rather than outputting the lockup ON command immediately when the vehicle speed reaches the lockup ON determination value, as mentioned above.

In addition, Japanese Patent Application Publications No. 2006-300285 (JP-A-2006-300285) and No. 2008-185088 (JP-A-2008-185088) each describe executing a preliminary abnormality determination process, in addition to an abnormality determination process, when detecting whether the control of a lockup mechanism is being properly executed.

Meanwhile, although the system described in JP-A-2008-51316 can determine whether the lockup control duty solenoid valve is suffering from a solenoid ON abnormality, the following should be taken into account.

In recent years, there have been demands for increasing the rate at which a precondition for performing, as one of diagnosis items for an in-vehicle abnormality diagnosis system (OBD), diagnosis for determining whether a lockup control duty solenoid valve is suffering from a solenoid ON abnormality (execution allowance condition) is satisfied when the vehicle has started from a situation where the lockup control duty solenoid valve is substantially functional (i.e., when the vehicle has started without the fail-safe control executed, such as when the vehicle has started after stopping without an engine stall). However, JP-A-2008-51316 describes neither technical concept nor specific structure for meeting the demands mentioned above, leaving a room for improvement.

Meanwhile, in order for the precondition for performing the solenoid ON abnormality diagnosis to be satisfied when the vehicle has started from a situation where the lockup control duty solenoid valve was functional, it is necessary to incorporate a measure or measures for improving the abnormality diagnosis accuracy, such as the one described above, into the precondition. In such a case (except cases where a solenoid ON abnormality occurs immediately after the vehicle has started), however, the output of the lockup ON command needs to be delayed despite the fact that the lockup control duty solenoid valve is functional, and therefore, for example, the time at which to start applying the lockup clutch becomes later than the target time, which may result in a reduction of the fuel economy. Thus, when the vehicle is started from a situation where the lockup control duty solenoid valve is functional, it is difficult to satisfy the precondition for performing the solenoid ON abnormality diagnosis and therefore it is difficult to increase the rate at which the precondition is satisfied.

JP-A-2006-300285 and JP-A-2008-185088 each describe no technical concept and no specific structure for meeting the aforementioned demands regarding in-vehicle abnormality diagnosis systems.

SUMMARY OF THE INVENTION

The invention provides a vehicle power transmission apparatus that has a torque converter with a lockup clutch and that provides an increased rate at which a precondition for performing diagnosis as to a solenoid ON abnormality of a lockup control solenoid valve (execution allowance condition) is satisfied when the lockup control solenoid valve is functional.

An aspect of the invention relates to a vehicle power transmission apparatus. The vehicle power transmission apparatus is provided with: a torque converter that has a lockup clutch; a hydraulic pressure control circuit that is used to apply and release the lockup clutch; and a control unit that controls a hydraulic pressure feeding path in the hydraulic pressure control circuit. The hydraulic pressure control circuit includes a spool valve that is switched between a first state where an apply hydraulic pressure is input to the lockup clutch and a second state where a release hydraulic pressure is input to the lockup clutch, a solenoid valve that inputs to the spool valve a switching control hydraulic pressure for placing the spool valve in the first state or the second state, and a fail-safe valve that inputs to the spool valve a control hydraulic pressure for forcing the spool valve to be placed in the second state, independently of whether the switching control hydraulic pressure is being input from the solenoid valve to the spool valve. The control unit is adapted to execute: switching control that outputs to the solenoid valve a lockup ON command for placing the spool valve in the first state when a vehicle speed is detected to have become equal to or higher than a lockup ON determination value; fail-safe control that forcibly releases the lockup clutch by activating the fail-safe valve; abnormality diagnosis control that determines, when a vehicle has started with the fail-safe control executed, whether the solenoid valve is suffering from a solenoid ON abnormality; and reproduction control that simulatively reproduces, when the vehicle has started without the fail-safe control executed, a condition coinciding with an execution allowance condition for allowing execution of the abnormality diagnosis control.

According to the vehicle power transmission apparatus described above, thus, a condition coinciding with the precondition for determining whether the solenoid valve is suffering from a solenoid ON abnormality, that is, a condition coinciding with the condition for allowing execution of the abnormality diagnosis control (execution allowance condition) is simulatively reproduced by the reproduction control that is executed when the vehicle has started without the fail-safe control executed (i.e., when the vehicle has started from a situation where the solenoid valve was functional). Thus, it is possible to increase the rate at which the condition for allowing execution of abnormality diagnosis is satisfied during normal traveling of the vehicle, that is, when the vehicle has started properly after stopping without suffering from any solenoid ON abnormality. Further, the reproduction control may include rate monitor control that determines a rate at which the execution allowance condition is satisfied, based on the number of times the condition coinciding with the execution allowance condition has been simulatively reproduced, and stores the rate in an information storage. In this case, since the rate is stored in the information storage, for example, car mechanics, or the like, can later extract the stored information and visually confirm an increase in the rate at which the condition for allowing execution of abnormality diagnosis is satisfied.

The vehicle power transmission apparatus may be such that the abnormality diagnosis control includes: a fail-safe OFF process that outputs, after the start of the vehicle, a fail-safe OFF command for discontinuing the fail-safe control when the vehicle speed is detected to have become equal to or higher than a fail-safe OFF determination value that is set smaller than the lockup ON determination value; a solenoid ON abnormality determination process that detects that a slip amount of the torque converter has decreased to a predetermined value or smaller as a result of the output of the fail-safe OFF command and that determines the solenoid valve as suffering from the solenoid ON abnormality if it is detected that a situation where the slip amount of the torque converter is equal to or smaller than the predetermined value has continued for a predetermined period of time from when the slip amount of the torque converter was detected to have decreased to the predetermined value or smaller; and a duration extension process that extends an abnormality determination duration by delaying a time at which to output the lockup ON command in the switching control by a predetermined time, if the vehicle speed is detected to have become equal to or higher than the lockup ON determination value before the determination as to the solenoid ON abnormality.

According to the structure above, since the duration extension process is executed during the abnormality diagnosis control, the abnormality determination duration can be made sufficient.

The vehicle power transmission apparatus may be such that when the vehicle speed is detected to have become equal to or higher than the lockup ON determination value after the start of the vehicle, the reproduction control executes, concurrently with the switching control, a reproduction process that simulatively reproduces the duration extension process by outputting a simulative lockup ON command, which is identical to the actual lockup ON command output in the switching control, a predetermined time after the actual lockup ON command is output.

According to the structure described above, the condition coinciding with the precondition for performing the determination as to the solenoid ON abnormality (execution allowance condition) can be established by executing the process that simulatively reproduces the process of extending the duration of the abnormality diagnosis control.

The vehicle power transmission apparatus may be such that whether the fail-safe control is executed at the start of the vehicle is determined based on whether a stall of an engine that inputs drive power to the vehicle power transmission apparatus was detected when the vehicle started the last time, and the fail-safe control is executed if a stall of the engine was detected and the fail-safe control is not executed if any stall of the engine was not detected.

The background of employment of the structure described above is as follows. A typical case where the engine stalls at the start of the vehicle is when the lockup clutch is stuck in the applied state due to some abnormality. However, such an engine stall can be prevented by executing the fail-safe control to forcibly release the lockup clutch at the start of the vehicle even if an abnormality is occurring in the lockup clutch. Then, if the fail-safe control is discontinued in response to the vehicle speed becoming equal to or higher than the fail-safe OFF determination value after the vehicle has thus started, the slip amount of the torque converter is different between a case where the vehicle has started while the lockup clutch is functional and a case where the vehicle has started while the lockup clutch fails and is stuck in the applied state, and therefore the abnormality diagnosis can be easily performed by monitoring such a phenomenon.

According to the vehicle power transmission apparatus according to the aspect of the invention, it is possible to increase the rate at which the precondition for performing the diagnosis for the solenoid ON abnormality (execution allowance condition) is satisfied when the lockup control solenoid valve is functional. Further, car mechanics, or the like, can later extract the information (rate) stored in the information storage and visually confirm an increase in the rate at which the condition for allowing execution of abnormality diagnosis is satisfied.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a timing chart illustrating the operation in a situation where the lockup control duty solenoid valve shown in FIG. 2 is functional;

FIG. 4 is a timing chart illustrating the abnormality diagnosis control for the lockup control duty solenoid valve shown in FIG. 2; and FIG. 5 is a timing chart illustrating the rate monitor control that is executed when the lockup control duty solenoid valve shown in FIG. 2 is functional.

DETAILED DESCRIPTION OF EMBODIMENTS

Figure 1:
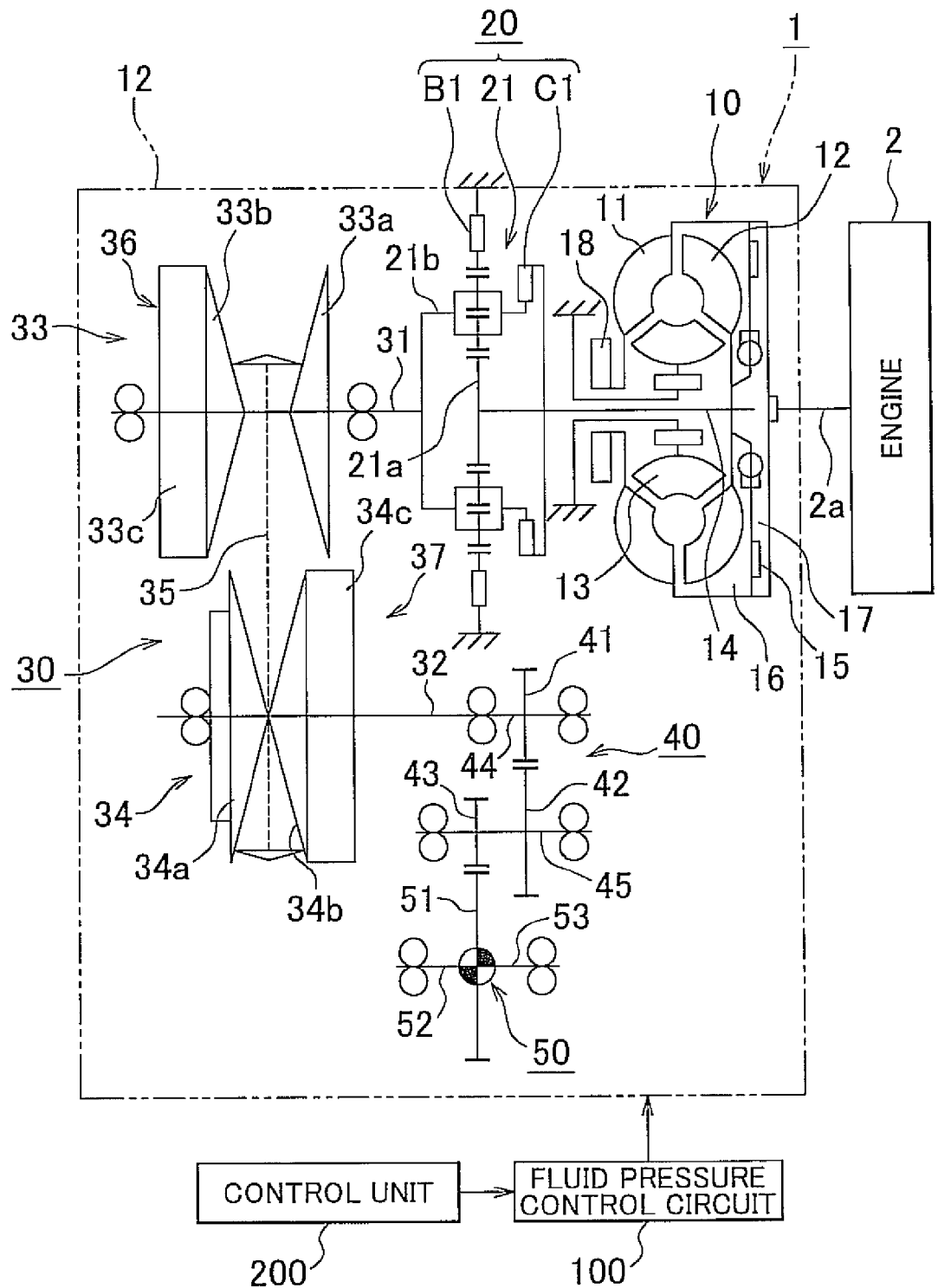
FIG. 1 is a skeleton view schematically showing the configuration of a vehicle power transmission apparatus according to an example embodiment of the invention.

Hereinafter, an example embodiment of the invention will be described in detail with reference to the accompanying drawings.

The example embodiment of the invention is illustrated in FIGS. 1 to 5. In the example embodiment, a vehicle power transmission apparatus according to the invention is embodied as a transaxle provided in an FF (Front-engine Front-drive) vehicle.

In the drawings, reference numeral 1 denotes the transaxle, and 2 denotes an engine (e.g., internal combustion engine), which is an example of drive power sources. The transaxle 1 is provided with a torque converter 10, a forward-reverse drive switch mechanism 20, a belt-drive continuously variable transmission 30, a reduction gearset 40, a differential 50, a hydraulic pressure control circuit 100, a control unit 200, etc.

In the transaxle 1, the output of the engine 2 is input to the torque converter 10, and then it is transferred from the torque converter 10 to the differential 50 via the forward-reverse drive switch mechanism 20, the belt-drive continuously variable transmission 30, and the reduction gearset 40. The power thus transferred to the differential 50 is then distributed to the left and right drive wheels (not shown in the drawings).

The torque converter 10 has a pump impeller 11 at the input side, a turbine runner 12 at the output side, a stator 13 that provides a torque increase effect, etc. Power is transferred between the pump impeller 11 and the turbine runner 12 via a fluid. The pump impeller 11 is coupled with a crankshaft 2a of the engine 2. The turbine runner 12 is connected to the forward-reverse drive switch mechanism 20 via a turbine shaft 14.

The torque converter 10 is provided with a lockup clutch 15 that is operable to directly connect the input and output sides of the torque converter 10 with each other. The lockup clutch 15 is selectively placed in the released state (lockup OFF) or the applied state (lockup ON) through the control of the difference between the hydraulic pressure in an apply side hydraulic chamber 16 and the hydraulic pressure in a release side hydraulic chamber 17 (=the hydraulic pressure in the apply side hydraulic chamber 16—the hydraulic pressure in the release side hydraulic chamber 17), which will hereinafter be referred to as "lockup differential pressure" where necessary or appropriate. It is to be noted that the hydraulic pressure is controlled as needed to reduce or suppress shocks when applying the lockup clutch 15.

As long as the lockup clutch 15 is fully applied, the pump impeller 11 and the turbine runner 12 rotate as one. Meanwhile, when the lockup clutch 15 has been applied to be placed in a given slipping state (transitional application state), as the torque converter 10 is driven by the engine 2, the turbine runner 12 rotates with a delay from the pump impeller 11, causing "slip" of a given amount at the lockup clutch 15. On the other hand, the lockup clutch 15 is in the released state as long as the lockup differential pressure is set negative. It is to be noted that the torque converter 10 is provided with a hydraulic pump (hydraulic pressure source) 18, which is a mechanical hydraulic pump coupled with the pump impeller 11 and driven thereby.

The forward-reverse drive switch mechanism 20 has a double-pinion planetary gearset 21, a forward drive clutch C1, a reverse drive brake B1, etc.

A sun gear 21a of the planetary gearset 21 is coupled with the turbine shaft 14, and a carrier 21b of the planetary gearset 21 is coupled with a primary shaft 31 of the belt-drive continuously variable transmission 30. The planetary gearset 21 outputs the drive power, which has been input from the turbine shaft 14, as forward drive power (normal direction drive power) or as reverse drive power (reverse direction drive power), with the forward drive clutch C1 and the reverse drive brake B1 controlled as needed.

The belt-drive continuously variable transmission 30 has a primary pulley (drive pulley) 33, a secondary pulley (driven pulley) 34, and a belt 35 wound around the primary pulley 33 and the secondary pulley 34.

The primary pulley 33 is provided on the radially outer side of the primary shaft 31 serving as an input shaft (drive shaft), while the secondary pulley 34 is provided on the radially outer side of a secondary shaft 32 serving as an output shaft (driven shaft). The primary pulley 33 has a stationary sheave 33a and a moveable sheave 33b that are paired, and the secondary pulley 34 has a stationary sheave 34a and a moveable sheave 34b that are paired as well.

With regard to the structure of the primary pulley 33, the stationary sheave 33a is integrally formed at the outer periphery of the primary shaft 31, and the moveable sheave 33b is arranged at the outer periphery of the primary shaft 31 such that it is axially slidable. The pitch radius of the belt 35 on the primary pulley 33 (i.e., the radius measured at the position where the belt 35 contacts the primary pulley 33) changes, as the width of the V groove defined by the stationary sheave 33a and the moveable sheave 33b is adjusted (increased or reduced) by sliding the moveable sheave 33b using a hydraulic servo 36.

With regard to the structure of the secondary pulley 34, the stationary sheave 34a is integrally formed at the outer periphery of the secondary shaft 32, and the moveable sheave 34b is arranged at the outer periphery of the secondary shaft 32 such that it is axially moveable. The pitch radius of the belt 35 on the secondary pulley 34 (i.e., the radius measured at the position where the belt 35 contacts the secondary pulley 34) changes, as the width of the V groove defined by the stationary sheave 34a and the moveable sheave 34b is adjusted (increased or reduced) by sliding the moveable sheave 34b using a hydraulic servo 37.

The speed reduction ratio of the belt-drive continuously variable transmission 30 increases as the pitch radius at the primary pulley 33 is reduced by the width of the V groove of the primary pulley 33 being increased by moving the moveable sheave 33b away from the stationary sheave 33a while the pitch radius at the secondary pulley 34 is increased by the width of the V groove of the secondary pulley 34, which is defined by the stationary sheave 34a and the moveable sheave 34b, being reduced.

On the other hand, the speed reduction ratio of the belt-drive continuously variable transmission 30 decreases as the pitch radius at the primary pulley 33 is increased by the width of the V groove of the primary pulley 33 being reduced by moving the moveable sheave 33b closer to the stationary sheave 33a while the pitch radius at the secondary pulley 34 is reduced by the width of the V groove of the secondary pulley 34, which is defined by the stationary sheave 34a and the moveable sheave 34b, being increased.

In operation, the reduction gearset 40 transfers the drive power output from the belt-drive continuously variable transmission 30 to the differential 50 while reducing the rotation speed. The reduction gearset 40 has a reduction drive gear 41, a reduction driven gear 42, a differential drive gear 43, etc.

A center shaft 44 of the reduction drive gear 41 is coaxially coupled with the secondary shaft 32 of the belt-drive continuously variable transmission 30, and therefore the reduction drive gear 41 and the secondary shaft 32 rotate as one. The reduction driven gear 42 and the differential drive gear 43 are integrally formed at positions axially adjacent to each other on a shaft 45 extending substantially in parallel to the secondary shaft 32. The reduction drive gear 41 is in mesh with the reduction driven gear 42, and the differential drive gear 43 is in mesh with a final ring gear 51 of the differential 50.

The differential 50 transfers the drive power input from the reduction gearset 40 to the drive wheels (not shown in the drawings) that are coupled, respectively, with a left axle shaft 52 and a right axle shaft 53, at a given distribution ratio.

Figure 2:
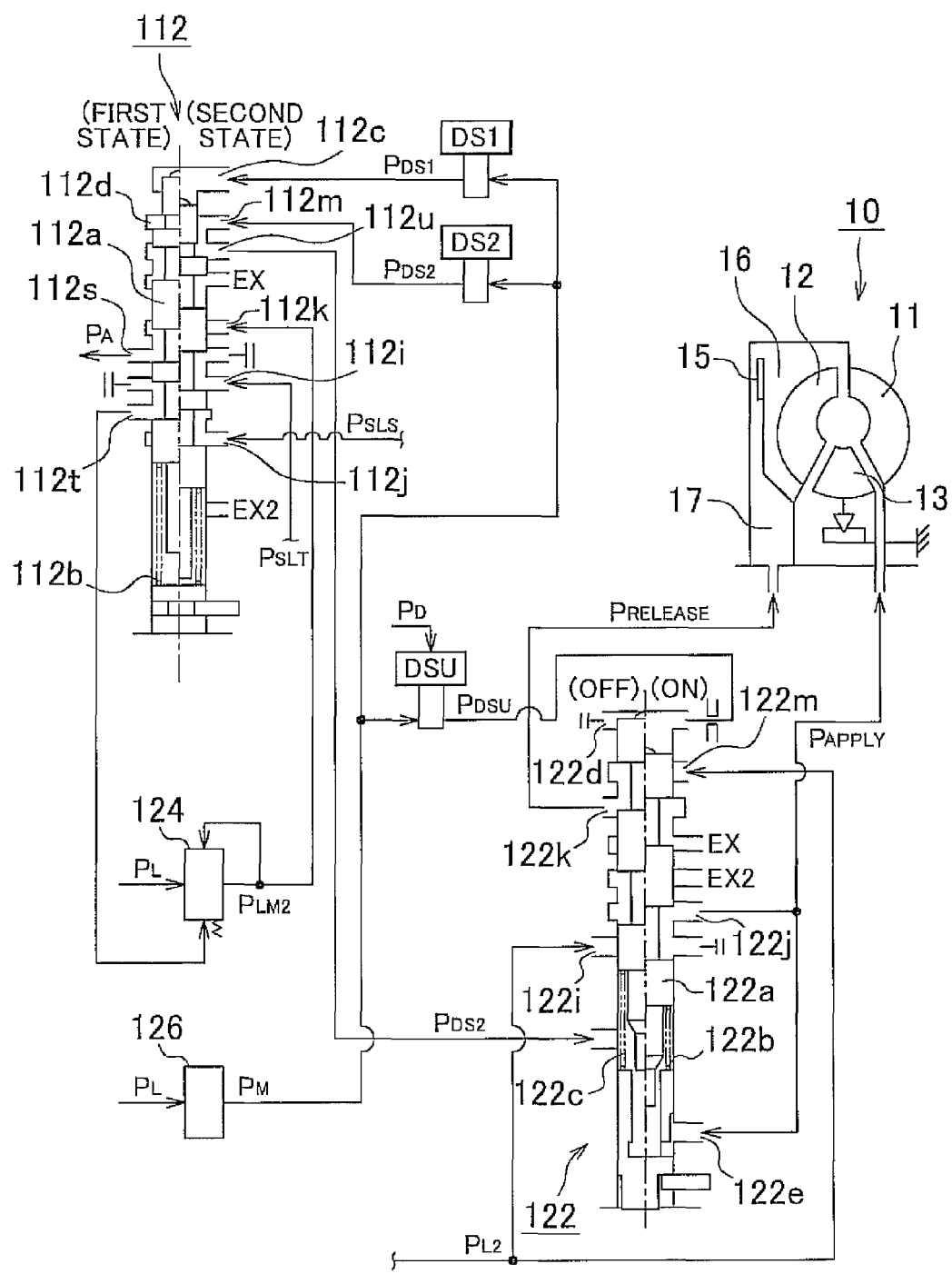
FIG. 2 is a view showing portions of the hydraulic pressure control circuit shown in FIG. 1, which are related to lockup clutch control.

As shown in FIG. 2, the hydraulic pressure control circuit 100 is provided with, as structural elements related to the switching control of the lockup clutch 15, at least a clutch apply control valve 112, a lockup control valve 122, a lockup control duty solenoid valve DSU, etc. It is to be noted that the clutch apply control valve 112 may be regarded as an example of "fail-safe valve" in the invention, the lockup control valve 122 may be regarded as an example of "spool valve" in the invention, and the lockup control duty solenoid valve DSU may be regarded as an example of "solenoid valve" in the invention.

A line hydraulic pressure $P_L$ is obtained from, as its source pressure, the hydraulic pressure output from (generated by) the hydraulic pump 18 driven by the engine 2, and is adjusted to the level (pressure value) corresponding to the engine load, and the like, using a line hydraulic pressure regulator valve (e.g., a relief type primary regulator valve), which is not shown in the drawings. A second line hydraulic pressure $P_{L2}$ is obtained from, as its source pressure, the hydraulic pressure discharged from the line hydraulic pressure regulator valve to adjust the line pressure $P_L$, and is adjusted using a second line hydraulic pressure regulator valve (e.g., a relief type secondary regulator valve), which is not shown in the drawings. An output hydraulic pressure $P_{LM2}$ is obtained from the line hydraulic pressure $P_L$ as its source pressure, and is adjusted using, for example, a line pressure modulator No. 2 valve 124. Further, a modulator hydraulic pressure $P_M$ is obtained from the line hydraulic pressure $P_L$ as its source pressure, and is adjusted at a constant pressure using a modulator valve 126. The modulator hydraulic pressure $P_M$ is the source pressure for a control hydraulic pressure $P_{DS1}$ that is output from a shift control duty solenoid valve DS1, a control hydraulic pressure $P_{DS2}$ that is output from a shift control duty solenoid valve DS2, and a control hydraulic pressure $P_{DSU}$ that is output from the lockup control duty solenoid valve DSU.

The lockup control duty solenoid valve DSU is a linear solenoid valve that outputs, when excited (ON), the control hydraulic pressure $P_{DSU}$ that is input to a hydraulic chamber 122d of the lockup control valve 122, so that the lockup control valve 122 is placed in the ON position shown in FIG. 2, and that stops, when not excited (OFF), outputting the control hydraulic pressure $P_{DSU}$, so that the lockup control valve 122 is placed in the OFF position shown in FIG. 2.

The lockup control valve 122 is a spool valve having a spool valve element 122a, a compression coil spring 122b, a hydraulic chamber 122c, the hydraulic chamber 122d, a feedback hydraulic chamber 122e, an input port 122i, an input-output port 122j, an input-output port 122k, an input port 122m, a drain port EX, a drain port EX2, etc.

The compression coil spring 122b urges the spool valve element 122a toward the OFF position (i.e., the position indicated at the left half of the lockup control valve 122 shown in FIG. 2). The control hydraulic pressure $P_{DS2}$ output from an output port 112u of the clutch apply control valve 112 is fed to the hydraulic chamber 122c. The control hydraulic pressure $P_{DSU}$ output from the lockup control duty solenoid valve DSU is fed to the hydraulic chamber 122d. A lockup apply hydraulic pressure $P_{APPLY}$ output from the input-output port 122j is fed to the feedback hydraulic chamber 122e. As the lockup apply hydraulic pressure $P_{APPLY}$ is fed to the feedback hydraulic chamber 122e, the spool valve element 122a is urged toward the OFF position.

Hereinafter, the basic operation of the lockup control valve 122 will be described.

First, as the control hydraulic pressure $P_{DSU}$ is input to the hydraulic chamber 122d by the lockup control duty solenoid valve DSU being excited (ON) in accordance with a lockup differential pressure command value $P_D$ that is output from the control unit 200, the spool valve element 122a moves, against the urging force of the compression coil spring 122b, toward the ON position (i.e., the position indicated at the right half of the lockup control valve 122 shown in FIG. 2) with a thrust of a magnitude corresponding to the control hydraulic pressure $P_{DSU}$.

When the spool valve element 122a is in the ON position, the lockup apply hydraulic pressure $P_{APPLY}$, which is obtained from, as its source pressure, the second line pressure $P_{L2}$ input to the input port 122i, is output from the input-output port 122j and then input to the apply side hydraulic chamber 16 of the lockup clutch 15, while the hydraulic in the release side hydraulic chamber 17 is drained from the drain port EX via the input-output port 122k, whereby the lockup clutch 15 is applied (lockup ON). Such a state where the spool valve element 122a is in the ON position may be regarded as an example of "first state" in the invention.

When applied, the lockup clutch 15 can be placed in various transitional apply states, as well as the full apply state. More specifically, because the lockup apply hydraulic pressure $P_{APPLY}$ is fed to the feedback hydraulic chamber 122e of the lockup control valve 122, as the current for exciting the lockup control duty solenoid valve DSU is continuously changed in accordance with the lockup differential pressure command value $P_D$ output from the control unit 200, the spool valve element 122a moves so that the control hydraulic pressure $P_{DSU}$, the lockup apply hydraulic pressure $P_{APPLY}$, and the urging force of the compression coil spring 122b are brought into equilibrium. Thus, the difference between the lockup apply hydraulic pressure $P_{APPLY}$ and a lockup release hydraulic pressure $P_{RELEASE}$, that is, the difference between the hydraulic pressure in the apply side hydraulic chamber 16 of the lockup clutch 15 and the hydraulic pressure in the release side hydraulic chamber 17 of the lockup clutch 15 is continuously controllable through the control hydraulic pressure $P_{DSU}$ that changes in accordance with the lockup differential pressure command value $P_D$, and therefore the lockup clutch 15 can be placed in a desired transitional apply state by controlling the pressure difference (differential pressure) as needed.

Meanwhile, when the excitation of the lockup control duty solenoid valve DSU has been interrupted (OFF) to stop inputting the control hydraulic pressure $P_{DSU}$ to the hydraulic chamber 122d, the spool valve element 122a moves to the OFF position under the urging force of the compression coil spring 122b.

When the spool valve element 122a is in the OFF position, the lockup release hydraulic pressure $P_{RELEASE}$, which is obtained from, as its source pressure, the second line pressure $P_{L2}$ input to the input port 122m, is output from the input-output port 122k and then input to the release side hydraulic chamber 17 of the lockup clutch 15, while the hydraulic fluid in the apply side hydraulic chamber 16 is drained from the drain port EX2 via the input-output port 122j, whereby the lockup clutch 15 is released (lockup OFF). Such a state where the spool valve element 122a is in the OFF position may be regarded as an example of "second state" in the invention.

The clutch apply control valve 112 is a spool valve having a spool valve element 112a, a compression coil spring 112b, a hydraulic chamber 112c, a diameter-change portion 112d, an input port 112i, an input port 112j, an input port 112k, an input port 112m, an output port 112s, an output port 112t, the output port 112u, a drain port EX, etc.

The clutch apply control valve 112 is maintained in the first state (normal position) indicated at the left half of the clutch apply control valve 112 shown in FIG. 2, with the spool valve element 112a urged upward by the compression coil spring 112b, and is placed in the second state (control position) indicated at the right half of the clutch apply control valve 112 shown in FIG. 2 by the spool valve element 112a moving in response to the control hydraulic pressure $P_{DS1}$ of a predetermined level or higher and the control hydraulic pressure $P_{DS2}$ of a predetermined level or higher being input, respectively, to the hydraulic chamber 112c and the input port 112m. When at least one of the input of the control hydraulic pressure $P_{DS1}$ to the hydraulic chamber 112c and the input of the control hydraulic pressure $P_{DS2}$ to the input port 112m is interrupted, the spool valve element 112a moves back to the position corresponding to the first state from the position corresponding to the second state.

The control hydraulic pressure $P_{DS1}$ of the predetermined level or higher and the control hydraulic pressure $P_{DS2}$ of the predetermined level or higher are fed, respectively, to the hydraulic chamber 112c and the input port 112m in response to the shift lever (not shown in the drawings) being shifted from the neutral position N to the drive position D or to the reverse position R, for example, when the vehicle is not running.

When the clutch apply control valve 112 is in the first state, as an output hydraulic pressure $P_{LM2}$ is input to the input port 112k, the output hydraulic pressure $P_{LM2}$ is output from the output port 112s and then fed, as an apply hydraulic pressure $P_A$, only to the forward drive clutch C1 via a manual valve (not shown in the drawings), and thus only the forward drive clutch C1 is applied.

When the clutch apply control valve 112 is in the second state, as a control hydraulic pressure $P_{SLT}$ is input to the input port 112i, the control hydraulic pressure $P_{SLT}$ is output from the output port 112s and then fed, as the apply hydraulic pressure $P_A$, only to the reverse drive brake B1 via a manual valve (not shown in the drawings), and thus only the reverse drive brake B1 is applied.

In addition, when the clutch apply control valve 112 is in the second state, as the control hydraulic pressure $P_{DS2}$ is input to the input port 112m, the control hydraulic pressure $P_{DS2}$ is output from the output port 112u and then input to the hydraulic chamber 122c of the lockup control valve 122. In this state, therefore, even if the control hydraulic pressure $P_{DSU}$ is being input to the hydraulic chamber 122d of the lockup control valve 122, the spool valve element 122a is forced to remain at the OFF position, and thus the lockup clutch 15 is forced to remain in the released state (lockup OFF). This is how "fail-safe control" is executed. In this way, the clutch apply control valve 112 can be used as a fail-safe valve for forcibly releasing the lockup clutch 15 in a case where the lockup clutch 15 remains applied due to an abnormality causing the solenoid of the lockup control duty solenoid valve DSU to remain in an on state (will hereinafter be referred to "solenoid ON abnormality").

When the state of the clutch apply control valve 112 has been switched from the second state to the first state to discontinue the fail-safe control, the control hydraulic pressure $P_{DS2}$ fed to the hydraulic chamber 122c of the lockup control valve 122 is drained from the drain port EX via the output port 112u. Thus, the apply control of the lockup clutch 15 is not affected by the remainder of the control hydraulic pressure $P_{DS2}$ that has been fed to the hydraulic chamber 122c.

The control unit 200 is an electronic control unit (ECU) having a central processing unit (CPU), a read only memory (ROM), a random access memory (RAM), a backup RAM, etc., which are interconnected. Stored in the ROM are various control programs, maps used for executing the respective control programs, and the like. The CPU performs arithmetic processing based on the respective control programs and maps stored in the ROM. The RAM is a memory for temporarily storing the results of arithmetic processing by the CPU, the data input from various sensors, etc. The backup RAM is a nonvolatile memory that stores various data, and the like, that should be stored, when the engine 2 is stopped.

The control unit 200 executes, for example, the shift control of the belt-drive continuously variable transmission 30 and the switching control of the lockup clutch 15 based on the information obtained from various sensors (not shown in the drawings), which includes, for example, an engine speed NE, a throttle valve opening degree θth, an engine coolant temperature Tw, a rotation speed NT of the turbine shaft 14, a vehicle speed V, an accelerator pedal operation amount Acc, the foot brake depression, the shift lever position, etc.

The switching control of the lockup clutch 15 is basically executed by applying parameters indicative of the state of the vehicle (the actual throttle valve opening degree θth and the actual vehicle speed V) to a control map (a map defining the conditions for applying and releasing the lockup clutch 15) that has been formulated in advance using, for example, the vehicle speed V and the throttle valve opening degree θth corresponding to the input torque as parameters, and that is stored in the ROM.

For example, when the operation point has crossed an apply line (or curve) (not shown in the drawings) in the control map described above as a result of the vehicle speed V increasing from a situation where the lockup clutch 15 is in the released state or as a result of the throttle valve opening degree θth decreasing from the same situation, a request for applying the lockup clutch 15 (lockup ON command) is output to the hydraulic pressure control circuit 100, so that the amounts of hydraulic pressures fed, respectively, to the apply side hydraulic chamber 16 and the release side hydraulic chamber 17 of the lockup clutch 15 are controlled so as to apply the lockup clutch 15. On the other hand, for example, when the operation point has crossed a release line (or curve) (not shown in the drawings) in the control map as a result of the vehicle speed V decreasing from a situation where the lockup clutch 15 is in the applied state or as a result of the throttle valve opening degree θth increasing from the same situation, a request for releasing the lockup clutch 15 (lockup OFF command) is output to the hydraulic pressure control circuit 100, so that the amounts of hydraulic pressures fed, respectively, to the apply side hydraulic chamber 16 and the release side hydraulic chamber 17 of the lockup clutch 15 are controlled so as to release the lockup clutch 15.

Further, the control unit 200 executes the fail-safe control, an abnormality diagnosis control, a reproduction control, etc.

The fail-safe control is control that forcibly releases the lockup clutch 15 by activating the clutch apply control valve 112, serving as a fail-safe valve in the hydraulic pressure control circuit 100.

The abnormality diagnosis control is diagnosis control for one of the diagnosis items for an onboard diagnosis system (OBD). More specifically, it determines whether the lockup control duty solenoid valve DSU in the hydraulic pressure control circuit 100 is suffering from a solenoid ON abnormality, after the vehicle has started with the fail-safe control executed.

The reproduction control is control for another of the diagnosis items for the OBD. During the reproduction control, for example, a condition coinciding with the condition for allowing execution of the abnormality diagnosis control described above (will hereinafter be referred to as "abnormality diagnosis control execution allowance condition" where necessary) is simulatively reproduced after the vehicle has started without the fail-safe control executed. The reproduction control may include a rate monitor control. In the rate monitor control, the rate at which the abnormality diagnosis control execution allowance condition is satisfied is determined based on the number of times that the reproduction has been performed, and the determined rate is stored in an information storage (e.g., the backup RAM).

Hereinafter, the above-stated switching control, fail-safe control, abnormality diagnosis control, reproduction control, and rate monitor control will be described in detail with reference to FIGS. 3 to 5. Note that the control processes executed by the control unit 200 will be mainly described in the following.

First, how the switching control of the lockup clutch 15 is executed when the lockup control duty solenoid valve DSU is functional will be described with reference to the timing chart of FIG. 3.

As shown in FIG. 3, the fail-safe control is not executed at the start of the vehicle if the lockup control duty solenoid valve DSU is functional. After the start of the vehicle, the vehicle speed gradually increases as shown at (a) VEHICLE SPEED in FIG. 3, as the engine torque is transmitted to the drive wheels (not shown in the drawings) via the transaxle 1. During this, in response to the vehicle speed reaching (or exceeding) a predetermined speed (lockup ON determination value $LU_{ON}$) at the time point t1, the lockup ON command is output as shown at (c) LOCKUP COMMAND in FIG. 3, applying the lockup clutch 15. As such, when the lockup control duty solenoid valve DSU is functional, any solenoid ON abnormality is not detected as shown in FIG. 3.

Next, how the respective controls are executed when the lockup control duty solenoid valve DSU is suffering from a solenoid ON abnormality will be described with reference to the timing chart of FIG. 4.

When the lockup control duty solenoid valve DSU is suffering from a solenoid ON abnormality, the control hydraulic pressure $P_{DSU}$ output from the lockup control duty solenoid valve DSU continues to be input to the hydraulic chamber 122c of the lockup control valve 122, and therefore the lockup control valve 122 is maintained in the ON state shown in FIG. 2, resulting in the lockup clutch 15 stuck in the applied state (lockup ON).

For example, the engine 2 will stall if the vehicle starts with the lockup clutch 15 thus stuck in the applied state. In the example embodiment, therefore, when a stall of the engine 2 has been detected, the control unit 200 determines that the lockup control duty solenoid valve DSU is suffering from a solenoid ON abnormality, and then executes the fail-safe control at the time of restarting the vehicle thereafter, in order to prevent the engine 2 from stalling again. As mentioned earlier, the fail-safe control forcibly releases the lockup clutch 15 using the clutch apply control valve 112.

As illustrated at (b) FAIL-SAFE CONTROL in FIG. 4, if the vehicle starts with the fail-safe control executed (i.e., with the lockup clutch 15 forcibly released), a stall of the engine 2 can be prevented at the start of the vehicle, and therefore the vehicle speed increases gradually, and smoothly as shown at (a) VEHICLE SPEED in FIG. 4, as it does in a situation where the lockup control duty solenoid valve DSU is functional.

Thereafter, in response to the gradually increasing vehicle speed reaching (or exceeding) a predetermined speed (fail-safe OFF determination value $FS_{OFF}$) at the time point t11, a command for discontinuing the fail-safe control (fail-safe OFF) is output as shown at (b) FAIL-SAFE CONTROL in FIG. 4, so that the fail-safe control is discontinued by interrupting the input of the control hydraulic pressure $P_{DS2}$ from the clutch apply control valve 112 to the hydraulic chamber 122c of the lockup control valve 122. It is to be noted that the fail-safe OFF determination value $FS_{OFF}$ is set to a value corresponding to the vehicle speed at which to start the solenoid ON abnormality diagnosis.

If the lockup control duty solenoid valve DSU is functional, the lockup clutch 15 remains released (lockup OFF) even after the fail-safe control is discontinued. In this case, therefore, the slip amount of the torque converter 10 continues gradual increase from the discontinuation of the fail-safe control. On the other hand, if the lockup control duty solenoid valve DSU is suffering from a solenoid ON abnormality, the lockup clutch 15 is forced back into the applied state (lockup ON) upon the discontinuation of the fail-safe control. In this case, therefore, as shown at (d) TORQUE CONVERTER SLIP AMOUNT in FIG. 4, the slip amount of the torque converter 10 starts decreasing at the time point t11 at which the fail-safe control is discontinued.

As such, if it is detected that the slip amount of the torque converter 10 has decreased and then become zero as described above, it indicates that the lockup control duty solenoid valve DSU may be suffering from a solenoid ON abnormality. In the example embodiment, however, when such a decrease in the slip amount of the torque converter 10 is detected, whether the slip amount of the torque converter 10 remains zero for a predetermined time Ts is further determined (monitored), in order to examine whether the decrease is a temporary phenomenon.

If the slip amount of the torque converter 10 has continuously been zero for the predetermined time Ts as shown at (d) TORQUE CONVERTER SLIP AMOUNT in FIG. 4, it is determined at the time point t13 that the lockup control duty solenoid valve DSU is suffering from a solenoid ON abnormality, that is, the lockup clutch 15 is stuck in the applied state due to the solenoid ON abnormality, as shown at (e) ABNORMALITY DETERMINATION in FIG. 4.

Meanwhile, the fail-safe OFF determination value $FS_{OFF}$ is set to a value smaller than the lockup ON determination value $LU_{ON}$ used in the switching control (i.e., a value corresponding to a lower vehicle speed), as shown at (a) VEHICLE SPEED in FIG. 4. If the difference between the fail-safe OFF determination value $FS_{OFF}$ and the lockup ON determination value $LU_{ON}$ ($LU_{ON}$–$FS_{OFF}$) is small, the time point t12, at which the lockup ON command is output, is immediately after the time point t11 at which the fail-safe OFF command is output, and as a result, only a short period of time allowed for the determination as to whether the lockup control duty solenoid valve DSU is suffering from a solenoid ON abnormality, that is, an abnormality diagnosis duration $T_T$ becomes insufficient.

In the example embodiment, therefore, in order to make the abnormality diagnosis duration $T_T$ sufficient, the lockup ON command is output at the time point t14 that is a predetermined time $T_L$ later than the time point t12, rather than being immediately output at the time point t12 at which the vehicle speed reaches the lockup ON determination value $LU_{ON}$. By thus delaying the output of the lockup ON command, the abnormality diagnosis duration $T_T$ is made sufficient. An example of "execution allowance condition" in the invention may be extending an abnormality determination duration by delaying a time at which to output the lockup ON command in the switching control by a predetermined time, if the vehicle speed is detected to have become equal to or higher than the lockup ON determination value before the determination as to the solenoid ON abnormality.

Next, the reproduction control and the rate monitor control will be described with reference to the timing chart of FIG. 5. The reproduction control is control that is executed to increase the rate at which the precondition for performing the determination as to whether the lockup control duty solenoid valve DSU is suffering from a solenoid ON abnormality is satisfied, that is, the rate at which the abnormality diagnosis control execution allowance condition described above is satisfied, when the lockup control duty solenoid valve DSU is functional.

More specifically, the reproduction control and the rate monitor control are executed in a situation where the lockup control duty solenoid valve DSU is functional, that is, in a situation where the vehicle has started without the fail-safe control executed, as shown at (b) FAIL-SAFE CONTROL in FIG. 5.

After the start of the vehicle, the vehicle speed gradually increases as the engine torque is transmitted to the drive wheels (not shown in the drawings) via the transaxle 1, as shown at (a) VEHICLE SPEED in FIG. 5. Because the reproduction control including the rate monitor control is executed on the condition that the fail-safe control is not executed, during the reproduction control, the fail-safe OFF command is not output when the gradually increasing vehicle speed reaches the fail-safe OFF determination value $FS_{OFF}$ at the time point t11, as shown at (b) FAIL-SAFE CONTROL in FIG. 5.

Then, in response to the gradually increasing vehicle speed reaching the lockup ON determination value $LU_{ON}$, the lockup ON command is output to apply the lockup clutch 15 (i.e., the switching control is executed), as shown at (c) LOCKUP COMMAND in FIG. 5. According to the rate monitor control, thus, the lockup control duty solenoid valve DSU normally operates (i.e., the DSU is applied) in response to the vehicle speed reaching the lockup ON determination value $LU_{ON}$, that is, it is possible to start applying the lockup clutch 15 at the target time without any delay, unlike in related-art controls. Thus, fuel efficiency is not deteriorated.

Then, concurrently with the switching control described above, a process is executed which simulatively reproduces the process of extending the abnormality diagnosis duration $T_T$, which is shown in FIG. 4, by outputting a simulative lockup ON command, which is identical to the actual lockup ON command output in the switching control, the predetermined time $T_L$ after the time point t12 at which the actual lockup ON command was output, as shown at (d) SIMULATIVE LOCKUP COMMAND in FIG. 5. For example, in a case where the slip amount of the torque converter 10 becomes zero after the lockup clutch 15 is applied, the slip amount of the torque converter 10 decreases from the time point t12. Thus, by reproducing the extension process in order for the abnormality diagnosis not to be finished at the time point t12, the time allowed for verifying that the slip amount of the torque converter 10 has become zero due to a solenoid ON abnormality, not as a result of the lockup clutch 15 having been applied, can be maximized.

Subsequently, in the rate monitor control, the count of an execution counter for counting the number of times the aforementioned reproduction process has been executed is incremented as shown at (e) EXECUTION COUNTER in FIG. 5. The rate described above is then calculated by dividing a cumulative value X indicating the incremented number of the count by a cumulative value Y indicating the number of times predetermined conditions demonstrating that the vehicle has traveled one time have been satisfied. The predetermined conditions are such that the vehicle is determined to have traveled one time each time the vehicle has started and then stopped. The calculated rate (=the cumulative value X/the cumulative value Y) is stored in an information storage (e.g., the backup RAM of the control unit 200). It is to be noted that the predetermined conditions stated above may alternatively be such that the vehicle is determined to have traveled one time each time the vehicle has traveled a predetermined distance or each time the vehicle has traveled for a predetermined period of time.

As such, the reproduction control described above simulatively reproduces, by generating the simulative lockup ON command, the abnormality diagnosis control that is executed in a situation where the vehicle has started with the fail-safe control executed (i.e., the abnormality diagnosis control illustrated in FIG. 4), when the abnormality diagnosis control is not actually executed.

According to the example embodiment of the invention, as described above, when the vehicle has started without the fail-safe control executed (i.e., when the vehicle has started from a situation where the lockup control duty solenoid valve DSU was functional), the reproduction control is executed to simulatively reproduce the same condition as the precondition for determining whether the lockup control duty solenoid valve DSU is suffering from a solenoid ON abnormality, that is, the abnormality diagnosis control execution allowance condition stated above. In this way, it is possible to increase the rate at which the abnormality diagnosis control execution allowance condition is satisfied when the vehicle is traveling in a normal state, i.e., a situation where no solenoid ON abnormality is occurring. Further, in the rate monitor control, since the rate (X/Y) is stored in the information storage (e.g., the backup RAM of the control unit 200), for example, car mechanics, or the like, can later extract the stored information and visually confirm the increase in the rate at which the abnormality diagnosis control execution allowance condition is satisfied.

While the invention has been described with reference to the example embodiment thereof, it is to be understood that the invention is not limited to the described example embodiment. To the contrary, the invention is intended to cover various modifications and equivalent arrangements within the scope of the invention, as those in the examples presented below.

(1) While the transaxle 1 for a vehicle having an FF drive system is used as a vehicle power transmission apparatus according to the invention in the example embodiment described above, the invention is not limited to this. That is, for example, the invention may be applied also to automatic transmissions for vehicles having various other drive systems, such as FR (Front-engine Rear-drive) drive systems, although not shown in the drawings. However, it is to be noted that a torque converter having a lockup clutch is an essential component in automatic transmissions to which the invention can be applied.

(2) While the transaxle 1 incorporating the belt-drive continuously variable transmission 30 is used in the example embodiment described above, the invention is not limited to this. That is, for example, the invention may be applied also to automatic transmissions incorporating a planetary-gearset-based transmission section and a torque converter in combination. It is to be noted that such a planetary-gearset-based transmission section is provided with a planetary gear mechanism and a plurality of friction couplings (i.e., clutches and brakes).

What is claimed is:

1. A vehicle power transmission apparatus comprising:
a torque converter that has a lockup clutch;
a hydraulic pressure control circuit that is used to apply and release the lockup clutch; and
a control unit that controls a hydraulic pressure feeding path in the hydraulic pressure control circuit, wherein:
the hydraulic pressure control circuit includes a spool valve that is switched between a first state where an apply hydraulic pressure is input to the lockup clutch and a second state where a release hydraulic pressure is input to the lockup clutch, a solenoid valve that inputs to the spool valve a switching control hydraulic pressure for placing the spool valve in the first state or the second state, and a fail-safe valve that inputs to the spool valve a control hydraulic pressure for forcing the spool valve to be placed in the second state, independently of whether the switching control hydraulic pressure is input from the solenoid valve to the spool valve; and
the control unit is adapted to execute: switching control that outputs to the solenoid valve a lockup ON command for placing the spool valve in the first state when a vehicle speed is detected to have become equal to or higher than a lockup ON determination value; fail-safe control that forcibly releases the lockup clutch by activating the fail-safe valve; abnormality diagnosis control that determines, when a vehicle has started with the fail-safe control executed, whether the solenoid valve is suffering from a solenoid ON abnormality; and reproduction control that simulatively reproduces, when the vehicle has started without the fail-safe control executed, a condition coinciding with an execution allowance condition for allowing execution of the abnormality diagnosis control.

2. The vehicle power transmission apparatus according to claim 1, wherein the abnormality diagnosis control includes: a fail-safe OFF process that outputs, after the start of the vehicle, a fail-safe OFF command for discontinuing the fail-safe control when the vehicle speed is detected to have become equal to or higher than a fail-safe OFF determination value that is set smaller than the lockup ON determination value; a solenoid ON abnormality determination process that detects whether a slip amount of the torque converter has decreased to a predetermined value or smaller as a result of the output of the fail-safe OFF command and that determines the solenoid valve as suffering from the solenoid ON abnormality if it is detected that a situation where the slip amount of the torque converter is equal to or smaller than the predetermined value has continued for a predetermined period of time from when the slip amount of the torque converter was detected to have decreased to the predetermined value or smaller; and a duration extension process that extends an abnormality determination duration by delaying a time at which to output the lockup ON command in the switching control by a predetermined time, if the vehicle speed is detected to have become equal to or higher than the lockup ON determination value before the determination as to the solenoid ON abnormality.

3. The vehicle power transmission apparatus according to claim 2, wherein when the vehicle speed is detected to have become equal to or higher than the lockup ON determination value after the start of the vehicle, the reproduction control executes, concurrently with the switching control, a reproduction process that simulatively reproduces the duration extension process by outputting a simulative lockup ON command, which is identical to the actual lockup ON command output in the switching control, a predetermined time after the actual lockup ON command is output.

4. The vehicle power transmission apparatus according to claim 1, wherein the reproduction control includes rate monitor control that determines a rate at which the execution allowance condition is satisfied, based on a number of times the condition coinciding with the execution allowance condition has been simulatively reproduced, and stores the rate in an information storage.

5. The vehicle power transmission apparatus according to claim 4, wherein the rate monitor control determines the rate by dividing a cumulative value indicating the number of times the condition coinciding with the execution allowance condition has been simulatively reproduced by a cumulative value indicating the number of times a predetermined travel condition demonstrating that the vehicle has traveled has been satisfied.

6. The vehicle power transmission apparatus according to claim 5, wherein the number of times the predetermined travel condition has been satisfied is incremented by one each time the vehicle has started and then stopped.

7. The vehicle power transmission apparatus according to claim 1, wherein whether the fail-safe control is executed at the start of the vehicle is determined based on whether a stall of an engine that inputs drive power to the vehicle power transmission apparatus was detected when the vehicle started the last time, and the fail-safe control is executed if a stall of the engine was detected and the fail-safe control is not executed if any stall of the engine was not detected.

* * * * *